US006730243B2

(12) United States Patent
Leblans et al.

(10) Patent No.: US 6,730,243 B2
(45) Date of Patent: May 4, 2004

(54) CESIUM HALIDE STORAGE PHOSPHOR WITH NARROW EMISSION SPECTRUM UPON UV-EXCITATION

(75) Inventors: Paul Leblans, Kontich (BE); Luc Struye, Mortsel (BE)

(73) Assignee: Afga-Gevaert, Mortsel (BE)

( * ) Notice: Subject to any disclaimer, the term of this patent is extended or adjusted under 35 U.S.C. 154(b) by 166 days.

(21) Appl. No.: 09/995,561

(22) Filed: Nov. 28, 2001

(65) Prior Publication Data

US 2003/0104121 A1 Jun. 5, 2003

Related U.S. Application Data

(60) Provisional application No. 60/264,486, filed on Jan. 26, 2001.

(30) Foreign Application Priority Data

Dec. 22, 2000 (EP) ............................................ 00204700

(51) Int. Cl.$^7$ .......................... C09K 11/55; C09K 11/41
(52) U.S. Cl. ................ 252/301.4 H; 427/64; 427/65; 427/157; 427/255.23; 427/255.28; 427/255.39; 427/255.395
(58) Field of Search .................... 252/301.4 H; 427/64, 427/65, 157, 255.23, 255.28, 255.39, 252.395

(56) References Cited

U.S. PATENT DOCUMENTS 5,736,069 A    4/1998   Willems et al. ...... 252/301.4 H 6,528,812 B1 * 3/2003 Leblans et al. ............. 250/588

FOREIGN PATENT DOCUMENTS

EP    0 174 875     3/1986
WO    87/04177     7/1987

OTHER PUBLICATIONS

Pedrero N. et al. "Analysis of Optical Behavior of Eu 2+ ions in CsCl Crystals", Physica Status Solidi B, vol 203, No. 2, 1997, p 591–98.*

Pedrero N. et al. "Analysis of the optical behavior of Eu2+ ions in CsCl crystals. An addendum" Adv. Sci. Technol. (Faenza Italy) (1999), 27 (Innovative Light Emitting Materials), 159–165, 1999, XP 000989425.

Pedrero N. et al. "Analysis of the optical behavior of Eu2+ ions in CsCl Crystals" Physica Status Solidi B, Basic Research, Akademie Verlag, Berlin, DE, vol. 203, No. 2, 1997, pp. 591–598, XP000912179.

* cited by examiner

*Primary Examiner*—C. Melissa Koslow
(74) *Attorney, Agent, or Firm*—Joseph T. Guy; Nexsen Pruet LLC

(57) ABSTRACT

A CsBr:Eu phosphor showing a narrow emission spectrum upon UV-excitation and panels including such a phosphor are disclosed. Also methods for preparing such a phosphor have been described.

8 Claims, No Drawings

CESIUM HALIDE STORAGE PHOSPHOR WITH NARROW EMISSION SPECTRUM UPON UV-EXCITATION

This application claims the benefit of U.S. Provisional Application No. 60/264,486 filed Jan. 26, 2001.

FIELD OF THE INVENTION

The present invention relates to a method for recording and reproducing images of objects made by high energy radiation. It relates especially to a method for manufacturing a cesium halide storage phosphor, an more particularly phosphors and a storage phosphor panel containing said phosphors.

BACKGROUND OF THE INVENTION

In computer radiography (CR), a photostimulable phosphor is used, which being incorporated in a panel, is exposed to incident pattern-wise modulated X-ray beam and, as a result thereof, temporarily stores energy contained in the X-ray radiation pattern. At some interval after the exposure, a beam of visible or infra-red light scans the panel in order to stimulate the release of stored energy as light that is detected and converted to sequential electrical signals which are can be processed in order to produce a visible image. For this purpose, the phosphor should store as much as possible incident X-ray energy and emit as little as possible stored energy until stimulated by the scanning beam.

The image quality that is produced by computer radiography largely depends on the construction of the phosphor screen. Generally, the thinner a phosphor screen at a given amount of absorption of X-rays, the better the image quality will be. This means that the lower the ratio of binder to phosphor of a phosphor screen, the better the image quality, attainable with that screen, will be. Optimized sharpness can thus be obtained when screens without any binder are used. Such screens can be produced, e.g., by physical vapour deposition, which may be thermal vapour deposition, sputtering, electron beam deposition or other of phosphor material on a substrate.

Use of alkali metal halide phosphors in storage screens or panels is well known in the art of storage phosphor radiology and the high crystal symmetry of these phosphors makes it possible to provide structured screens and binderless screens. In U.S. Pat. No. 5,055,681 e.g. a storage phosphor screen comprising an alkali metal phosphor in a pile-like structure is disclosed.

In U.S. Pat. No. 5,736,069 an alkali metal storage phosphor is disclosed corresponding to the formula:

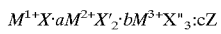

$M^{1+}X \cdot aM^{2+}X'_2 \cdot bM^{3+}X''_3 : cZ$ wherein $M^{1+}$ is at least one member selected from the group consisting of Li, Na, K, Cs and Rb, $M^{2+}$ is at least one member selected from the group consisting of Be, Mg, Ca, Sr, Ba, Zn, Cd, Cu, Pb and Ni, $M^{3+}$ is at least one member selected from the group consisting of Sc, Y, La, Ce, Pr, Nd, Pm, Sm, Eu, Gd, Tb, Dy, Ho, Er, Tm, Yb, Lu, Al, Bi, In and Ga, Z is at least one member selected from the group $Ga^{1+}$, $Ge^{2+}$, $Sn^{2+}$, $Sb^{3+}$ and $As^{3+}$, X, X' and X'' can be the same or different and each represents a halogen atom selected from the group consisting of F, Br, Cl, and I, and $0 \leq a \leq 1$, $0 \leq b \leq 1$ and $0 < c \leq 0.2$.

In EP-A-174 875 and EP-B-252 991 (and the corresponding U.S. Pat. No. 5,028,509), among other alkali metal stimulable phosphors a CsBr:Eu phosphor is disclosed, wherein Eu is incorporated in the CsBr by firing CsBr with europium oxide.

In U.S. Provisional Patent Application No. 60/142,276, filed Jul. 2, 1999 and U.S. Provisional Patent Application No. 60/159,004, filed Oct. 8, 1999, a novel CsX:Eu has been disclosed wherein the europium dopant is introduced in the CsX by firing CsX with a europium compound containing an halide atom. This phosphor shows high speed and can be used in order to prepare thin binderless screens with good speed.

Nevertheless, since in medical X-ray diagnosis the quest for systems making it possible to lower the patient dose and to keep the image quality still proceeds, there remains a need to have storage phosphors with enhanced speed.

OBJECTS AND SUMMARY OF THE INVENTION

It is a first object of the invention to provide a novel cesium halide phosphor exhibiting high speed.

It is a further object of the invention to provide a method for producing a novel cesium halide phosphor, where such phosphor exhibits a high speed.

It is a still further object of the invention to provide a panel, containing a cesium halide phosphor that exhibits a high speed.

Further objects and advantages of the invention will become clear from the detailed description hereinafter.

The objects of the invention are realized by providing a CsX:Eu phosphor showing upon excitation with light of 370 nm at a wavelength of $\lambda_{max}$ a maximum emission intensity $I_0$ and at $\lambda_{max}+30$ nm an emission intensity I, such that $I \leq 0.20\ I_0$.

DETAILED DESCRIPTION OF THE INVENTION

It has been found upon experimentation that storage phosphor screens containing a CsX:Eu phosphor showing a narrow emission spectrum upon UV-excitation did show an enhanced speed when used as storage phosphor screen for radiography. It was found that it was especially important that the emission spectrum of the phosphor upon UV-excitation did have a low emission intensity at the higher wavelength region. Storage phosphor screens or panels incorporating such a phosphor did show a speed increase ranging from 50% to a factor 10 and even 20 when compared to screens incorporating phosphors having upon UV excitation a higher emission intensity at the higher wavelength region.

It has been found upon experimentation that the speed increase of phosphor screens, including a CsX:Eu phosphor with a narrow emission spectrum upon UV-excitation, was very pronounced when said CSX:Eu phosphor, was either a CsBr or CsCl phosphor wherein the Eu doping had proceeded by adding a europium compound containing a halogen atom.

It is clear that this higher speed is very beneficial while it gives more degrees of freedom in finding a trade-off between speed a image quality in computer radiographic system using those screens.

It seems that when a CsX:Eu phosphor with narrow emission spectrum upon UV excitation has absorbed X-ray energy, this energy is, upon stimulation, released as emitted light having also a narrow spectral distribution around a maximum emission, so that more useful light is emitted.

A phosphor showing a narrow emission spectrum upon UV excitation is defined as a phosphor showing upon excitation with light of 370 nm a maximum emission intensity $I_0$ at a wavelength of $\lambda_{max}$ and at $\lambda_{max}$+30 nm an emission intensity I, such that $I \leq 0.20\ I_0$. It is even more preferred that a phosphor with a narrow emission spectrum upon UV excitation shows upon excitation with light of 370 nm a maximum emission intensity $I_0$ at a wavelength of $\lambda_{max}$ and at $\lambda_{max}$+30 nm an emission intensity I, such that $I \leq 0.15\ I_0$.

The emission spectrum of a CsX:Eu phosphor upon UV excitation can be narrowed by incorporating in the production process of the phosphor a step of maintaining the phosphor for some time, between 10 minutes to about 15 hours, at a temperature between 80° C. and 220° C. Further on in this text the step of maintaining the phosphor for a given time at a given temperature will be called "annealing step", although it is not sure that strictu sensu an "annealing of the crystal structure" takes place. Preferably during the "annealing step", the temperature is kept between 100° C. and 180° C. and the time between 30 minutes and 10 hours. Most preferably the "annealing step", is executed at a temperature between 130 and 170° C. for between 2 and 5 hours. It was found that to some extent, within the limits given above, time and temperature of the "annealing step", are interchangeable.

Without being bound to any theory, it is believed that in a phosphor according to this invention the distribution of the europium dopant is changed so that the "impurity centre" is more active.

The "annealing step" can be introduced in the production process of the phosphor at different stages.

Thus the invention encompasses a method for preparing a CsX:Eu phosphor comprising the steps of :
mixing or combining (in another way) CsX with between $10^{-3}$ mol % and 5 mol % of a europium compound,
heating (e.g., firing) said mixture at a temperature above 450° C.;
cooling said mixture to room temperature,
bringing said mixture after cooling to a temperature between 80 and 220° C. and
maintaining it at that temperature for between 10 minutes and 15 hours.

In this method after the step of cooling the mixture to room temperature and before the step of bringing said cooled mixture to a temperature between 80 and 220° C., a step of grinding to form fine phosphor particles and a step of classifying these phosphor particles can be included.

It is also possible to include the "annealing step", immediately, after firing, thus the step of cooling the mixture to room temperature is omitted and the mixture is brought to a temperature between 80 and 220° C. directly after firing. The invention thus also encompasses a method comprising the steps of
mixing or combining (in another way) CsX with between $10^{-3}$ mol % and 5 mol % of a europium compound,
heating (e.g., firing) said mixture at a temperature above 450° C.;
bringing said mixture after cooling to a temperature between 80 and 220° C. and
maintaining it at that temperature for between 10 minutes and 15 hours.

The step of cooling the mixture to room temperature can then be included after the step of maintaining it at that temperature for between 10 minutes and 15 hours.

The "annealing step", can also be beneficially included when producing binderless phosphor screens comprising a CsX:Eu phosphor.

The method comprises thus a method for producing a binderless CsX:Eu phosphor screen comprising the steps of:
mixing or (otherwise) combining CsX with between $10^{-3}$ mol % and 5 mol % of a europium compound,
vapour depositing that mixture onto a substrate, forming a binderless phosphor screen,
cooling said phosphor screen to room temperature,
bringing said phosphor screen to a temperature between 80 and 220° C. and
maintaining it at that temperature for between 10 minutes and 15 hours.

It is also possible to include the "annealing step", immediately, after vapour deposition, thus the step of cooling to the phosphor screen to room temperature is omitted and the phosphor screen is brought to a temperature between 80 and 220° C. directly after vapour deposition. The invention thus also encompasses a method comprising the steps of:
mixing or (otherwise) combining CsX with between $10^{-3}$ mol % and 5 mol % of a europium compound,
vapour depositing that mixture onto a substrate, forming a binderless phosphor screen,
bringing said phosphor screen to a temperature between 80 and 220° C. and
maintaining it at that temperature for between 10 minutes and 15 hours.

The step of cooling the phosphor screen to room temperature can then be included after the step of maintaining it at that temperature for between 10 minutes and 15 hours.

It is clear that the vapour deposition does not have to start from the precursors, but that it can also proceed by vapour depositing the phosphor itself.

EXAMPLES

I. "Annealing" of a Phosphor

A. Preparation of the Phosphors

The phosphor crystal was prepared in the following way: $EuBr_3$ was received in hydrated form from a commercial vendor and dried before preparing the CsBr:Eu phosphor. Specifically, hydrated europium bromide was placed in a desiccator with desiccant and dried under vacuum for 24 hours. Despite such drying, it is possible that residual water was present and that the europium bromide was in a partially hydrated form. Moreover, given the hygroscopic nature of the materials involved, water may also become included in the europium bromide, in other starting materials and/or in the combined mixture during transfer and handling of such compounds or mixtures.

A crystal of the activated CsBr was prepared by mixing by manual grinding 20 g of 99.999% pure CsBr with 1 mole % of the $EuBr_3$ activator. The mixture was placed in an $Al_2O_3$ crucible and placed in the quartz tube of a tube furnace.

The quartz tube was sealed with a flange with water lock and flushed with carrier gas prior to firing and during the firing process. The gas flow rate was 120 cc/min. The carrier gas was Ar with 5.8 mol % of $H_2$.

The furnace temperature was increased from room temperature to 43° C. at a rate of 5° C./min. Dwell time at this temperature was 6 hours. Next the temperature was ramped to 700° C. at 10° C./min. Dwell time at 700° C. was 5 minutes. The furnace was cooled to room temperature at 10° C./min.

The crucible containing the phosphor was removed from the furnace, whereafter the crucible was broken in order to set the phosphor crystals free. Larger crystalline particles were selected and polished to a thickness of ca. 1000 μm for measurement.

B. "Annealing" Procedure and its Effect on Conversion Efficiency

The conversion efficiency of the crystal thus obtained was measured in the way described above.

Next the crystal was annealed by heating it to 150° C., in air, for 1 hour and the conversion efficiency was measured again.

The conversion efficiency of the crystal prior to "annealing" was:

70 pJ/mm$^2$/mR and the conversion efficiency after "annealing" was:

110 pJ/mm$^2$/mR indicating that for the CsBr:Eu crystal sample the "annealing", process resulted in an increase of the phosphor sensitivity with about 60%.

C. Measurement of the Conversion Efficiency

The total photostimulable energy stored upon exposure to a well-defined X-ray dose was determined. This property was expressed as "conversion efficiency" (C. E.).

Prior to X-ray excitation any residual energy still present in the phosphor screen was removed by irradiation with light of a 500 W quartz-halogen lamp. The phosphor screen was then excited with an X-ray source operating at 80 kVp and 5 mA. For that purpose the BALTEAUGRAPHE 2000 (trade name) X-ray source of Balteau, France was used. The low energy X-rays are filtered out with a 21 mm thick aluminium plate in order to harden the X-ray spectrum. After X-ray excitation the phosphor screen was transferred in the dark to the measurement set-up. In this set-up laser light was used in order to photostimulate the X-ray irradiated phosphor screen. The laser used in this measurement was a diode laser emitting at 690 nm with a power of 5 mW. The diode laser was the type LT030-MD, trade name of SHARP, USA.

The laser-optics comprise an electronic shutter, a beam-expander and a filter. A photomultiplier (HAMAMATSU R 376) collects the light emitted by photostimulation and gives a corresponding electrical current. The measurement procedure was controlled by a Hewlett Packard HP 382 (trade name) computer connected to a HP 6944 (trade name) multiprogrammer. After amplification with a current to voltage converter a TEKTRONIX TDS 420 (trade name) digital oscilloscope visualises the photocurrent obtained. When the electronic shutter was opened the laser beam begins to stimulate the phosphor screen and the digital oscilloscope was triggered. Using a diaphragm placed in contact with the screen the light emitted by only 7 mm$^2$ was collected. Approximately half of the laser power (2 mW) reaches the screen surface. In this way the intensity of the stimulating beam was more uniform.

The stimulating laser light (transmitted by the crystal) and the stimulated emission light are separated by a 6 mm BG 39 SCHOTT (trade name) filter, so that only the emitted light reaches the photomultiplier.

The signal amplitude from the photomultiplier is linear with the intensity of the photostimulating light and with the stored photostimulable energy. The signal decreases with time. When the signal curve was entered the oscilloscope was triggered a second time to measure the offset which was defined as the component of error that was constant and independent of inputs. After subtracting this offset the point at which the signal reaches 1/e of the maximum value was calculated. The integral below the curve was then calculated from the start to this 1/e point. The function was described mathematically by $f(t)=A.e^{-t/\tau}$; wherein A is the amplitude, t is the time constant, τ is stimulation time, and e is the base number of natural logarithms.

The 1/e point is reached when t=τ at which 63% of the stored energy has been released. In order to obtain the said result the computer multiplies the integral with the sensitivity of the system. The sensitivity of the photomultiplier and amplifier have therefore to be measured as a function of anode-cathode voltage of the photomultiplier and the convolution of the emission spectrum of the phosphor, the transmission spectrum of the 6 mm BG 39 SCHOTT (trade name) filter and the wavelength dependence of the response of the photomultiplier have to be calculated. Because the emission light is scattered in all directions only a fraction of the emitted light is detected by the photomultiplier. The position of the panel and photomultiplier are such that 10% of the total emission was detected by the photomultiplier. After all these corrections have been made a conversion efficiency value (C. E.) was obtained in pJ/nm $^2$/mR.

II: "Annealing" of a Screen Containing Vacuum Deposited Phosphor

A. Preparation of the Vapour Deposited Screens

CsBr:Eu screens were made via thermal vapour deposition of CsBr and EuOBr. For this purpose CsBr was mixed with EuOBr and placed in a container in a vacuum deposition chamber. The phosphor was deposited on a glass disk with a thickness of 1.5 mm and a diameter of 40 mm. The distance between the container and the substrate was 10 cm. During vapour deposition, the substrate was rotated at 12 rpm. Different screens were produced having the container with starting materials at different temperatures as indicated in the Table below. Before the start of the evaporation, the chamber was evacuated to a pressure of 4.10$^{-5}$ mbar. During the evaporation process, Ar was introduced in the chamber.

The Eu-concentration in the evaporated screens was measured with X-ray fluorescence and is indicated in the Table 1 below.

TABLE 1

| Screen | Thickness (μm) | [Eu] (ppm) | T container (° C.) |
|---|---|---|---|
| Example 1 | 736 | 500 | 730 |
| Example 2 | 431 | <350 | 680 |
| Example 3 | 927 | <250 | 780 |
| Example 4 | 506 | 750 | |
| Example 5 | 852 | 400 | 730 |
| Example 6 | 669 | 500 | 730 |
| Example 7 | 483 | 450 | 730 |
| Example 8 | 449 | 500 | 730 |

B. Measurement of UV Excitation Spectrum

Photoluminescence measurements were performed at room temperature on a SPEX DM3000F spectrofluorometer equipped with 0.22 m SPEX 1680 monochromators (resolution 0.1 nm) and a 450 W xenon lamp. The stimulating UV-light had a wavelength of 370 nm. The emission spectra were measured and corrected for the photomultiplier sensitivity and for the spectrum distortion by the monochromator. For each of the screens $I_0$ at $\lambda_{max}$ and I at $\lambda_{max}$+30 nm was determined before and after annealing. The values are mentioned in Table 2 hereinafter, under the heading $I/I_0$.

C. "Annealing" Procedure and its Effect on Conversion Efficiency

The sensitivities of the obtained screens were measured as described herein below.

Next, the screens were annealed by heating to 150° C., in air for 4 hours and the sensitivities were measured again. The sensitivities prior and after "annealing" are given in Table 2

D. Measurement of the Screen Sensitivity "S"

The sensitivity of the vapour deposited screens was measured in the following way:

The screens were homogeneously irradiated with a dose of ca. 50 mR at 80 kVp.

Read out was done in a flying spot scanner. In the scanner, the scanning light source was a 30 mW diode laser emitting at 690 nm. A 4-mm BG-39® (trade name of HOYA) filter was used in order to separate the stimulation light from the screen emission light. The scan-average levels (SAL's) were determined as the average signal produced by the screens in the photomultiplier tube.

TABLE 2

| Screen | S (%) Before "annealing" | I/I$_0$ before | T in ° C. and time (h) of annealing | S (%) After "annealing" | I/I$_0$ after |
|---|---|---|---|---|---|
| Example 1 | 1,358 | 0.24 | 150/4 | 2,555 | 0.12 |
| Example 2 | 1,192 | 0.21 | 150/4 | 1,904 | 0.14 |
| Example 3 | 737 | 0.31 | 150/4 | 1,990 | 0.13 |
| Example 4 | 1,219 | 0.23 | 150/4 | 2,209 | 0.12 |
| Example 5 | 1,645 | 0.21 | 150/4 | 2,986 | 0.12 |
| Example 6 | 1,326 | 0.25 | 150/4 | 2,579 | 0.13 |
| Example 7 | 1,311 | 0.26 | 150/4 | 2,326 | 0.12 |
| Example 8 | 704 | 0.30 | 150/4 | 3,139 | 0.12 |
| Example 8 | 704 | 0.30 | 200/4 | 1,631 | 0.20 |
| Example 8 | 704 | 0.30 | 100/4 | 1,902 | 0.16 |

It is clear from the results summarized in Table 2 that the "annealing", process increases the sensitivities with a factor of 1.6 up to 4.5 (see the Example 8 screen).

What is claimed is:

1. A CsBr:Eu phosphor showing upon excitation with light of 370 nm at a wavelength of $\lambda_{max}$ a maximum emission intensity $I_0$ and at $\lambda_{max}$ +30 nm an emission intensity I, such that $I \leq 0.20\ I_0$.

2. A CsBr:Eu phosphor according to claim 1, wherein $I \leq 0.15\ I_0$.

3. A CsBr:Eu phosphor according to claim 1, wherein Eu has been introduced using a europium compound containing an halogen atom.

4. A CsBr:Eu phosphor according to claim 1, wherein during the preparation of said phosphor an "annealing step" is introduced.

5. A method for preparing a CsBr:Eu phosphor comprising the steps of:

mixing or combining CsBr with between $10^{-3}$ mol % and 5 mol % of a europium compound wherein said europium compound is a member selected from the group consisting of EuX'$_2$, EuX'$_3$ and EuOX', X' being selected from the group consisting of F, Cl, Br, I and combinations thereof, heating said mixture at a temperature above 450° C.;

cooling said mixture to room temperature, bringing said mixture after cooling to a temperature between 80 and 220° C. and maintaining said mixture at that temperature for a time between 10 minutes and 15 hours.

6. A method for preparing a CsBr:Eu phosphor comprising the steps of:

mixing or combining CsBr with between $10^{-3}$ mol % and 5 mol % of a europium compound wherein said europium compound is a member selected from the group consisting of EuX'$_2$, EuX'$_3$ and EuOX', X' being selected from the group consisting of F, Cl, Br, I and combinations thereof, heating said mixture at a temperature above 450° C.;

cooling said mixture to a temperature between 80 and 220° C. maintaining said mixture at that temperature for between 10 minutes and 15 hours; and cooling said mixture to room temperature.

7. A method for producing a binderless CsBr:Eu phosphor screen comprising the steps of:

mixing or combining CsBr with between $10^{-3}$ mol % and 5 mol % of a europium compound wherein said europium compound is a member selected from the group consisting of EuX'$_2$, EuX'$_3$ and EuOX', X' being selected from the group consisting of F, Cl, Br, I and combinations thereof, vapour depositing that mixture onto a substrate, forming a binderless phosphor screen, cooling said phosphor screen to room temperature, bringing said phosphor screen to a temperature between 80 and 220° C. and maintaining it at that temperature for between 10 minutes and 15 hours.

8. A method for preparing a binderless CsBr:Eu phosphor screen comprising the steps of:

mixing or combining CsBr with between 10–3 mol% and 5 mol% of a europium compound wherein said europium compound is a member selected from the group selected from EuX'$_2$, EuX'$_3$ and EuOX', X' being selected from the group consisting of F, Cl, Br, I and combinations thereof, vapor depositing that mixture onto a substrate, forming a binderless phosphor screen;

cooling said screen to a temperature between 80 and 220° C.;

maintaining it at that temperature for between 10 minutes and 15 hours; and cooling said screen to room temperature.

* * * * *